(12) United States Patent
Herren et al.

(10) Patent No.: US 11,905,671 B2
(45) Date of Patent: Feb. 20, 2024

(54) SORBENT-BASED OIL SKIMMER AND METHODS OF USE

(71) Applicant: The Board of Regents of the University of Oklahoma, Norman, OK (US)

(72) Inventors: Blake A. Herren, Norman, OK (US); Yingtao Liu, Norman, OK (US); M. Cengiz Altan, Norman, OK (US); Mrinal C. Saha, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 17/581,304

(22) Filed: Jan. 21, 2022

(65) Prior Publication Data

US 2022/0228339 A1    Jul. 21, 2022

Related U.S. Application Data

(60) Provisional application No. 63/234,066, filed on Aug. 17, 2021, provisional application No. 63/140,179, filed on Jan. 21, 2021.

(51) Int. Cl.
*E02B 15/04* (2006.01)
*E02B 15/10* (2006.01)

(52) U.S. Cl.
CPC .......... *E02B 15/045* (2013.01); *E02B 15/048* (2013.01); *E02B 15/101* (2013.01)

(58) Field of Classification Search
CPC .... E02B 15/045; E02B 15/048; E02B 15/101; E02B 15/106; C02F 2103/08; C02F 1/288; C02F 1/40; C02F 2305/08; Y02A 20/204

(Continued)

(56) References Cited

U.S. PATENT DOCUMENTS 3,667,608 A * 6/1972 Burroughs .............. A47L 13/20
                                                    210/924
3,986,959 A * 10/1976 Bagot ................... E02B 15/101
                                                    210/924

(Continued)

FOREIGN PATENT DOCUMENTS

CN      105040656 A * 11/2015 ............. E02B 15/10
DE      2343989 A1 * 8/1973 ............. E02B 15/04

(Continued)

OTHER PUBLICATIONS

What_Is_Joule_Heating_NPL_2022.pdf (Year: 2022).*

(Continued)

*Primary Examiner* — Ekandra S. Miller-Cruz
(74) *Attorney, Agent, or Firm* — Crowe & Dunlevy, P.C.

(57) ABSTRACT

A sorbent-based oil skimmer is configured to collect oil from an oil layer and passively deposit the oil in an encasing, where the oil can be continuously or periodically removed. The oil skimmer includes an encasing and a sponge that is partially enclosed within the encasing. The sponge has a top sheet in contact with the oil layer and a shell connected to the top sheet, where the shell extends into the encasing. Oil collected by the top sheet is conveyed through the shell, where it is deposited into the encasing under the force of gravity. In some applications, the sponge is manufactured from a silicone-based polymer that has been impregnated with carbonaceous material. The skimmer may optionally include counterweights, ballast tanks, buoyancy adjustment systems and propulsion modules.

18 Claims, 7 Drawing Sheets

(58) Field of Classification Search
USPC .......................................................... 210/693
See application file for complete search history.

(56) References Cited

U.S. PATENT DOCUMENTS

| | | | | |
|---|---|---|---|---|
| 4,011,158 | A * | 3/1977 | Cook ................... | B01D 17/045 |
| | | | | 210/DIG. 5 |
| 4,126,556 | A * | 11/1978 | Swanson ............ | B01D 17/0214 |
| | | | | 210/924 |
| 4,172,039 | A | 10/1979 | Akiyama | |
| 4,378,291 | A * | 3/1983 | Ward ................... | E02B 15/106 |
| | | | | 210/923 |
| 6,500,337 | B1 * | 12/2002 | Ehrnsperger ........... | B01D 15/00 |
| | | | | 210/923 |
| 9,718,703 | B2 * | 8/2017 | Wang ................... | B01J 20/2805 |
| 9,868,652 | B1 * | 1/2018 | Washburn ............. | E02B 15/104 |
| 2005/0126977 | A1 | 6/2005 | Carter | |

FOREIGN PATENT DOCUMENTS

| | | | | |
|---|---|---|---|---|
| GB | 1419106 | A * | 12/1975 | ................ C02F 1/40 |
| JP | 10259607 | A | 9/1998 | |

OTHER PUBLICATIONS

Degobert_DE2343989A1_translated.pdf (Year: 1973).*
Song_CN105040656A_translated.pdf (Year: 2015).*
Chen J, Zhang W, Wan Z, Li S, Huang T, Fei Y. Oil spills from global tankers: Status review and future governance. Journal of Cleaner Production. 2019;227:20-32.
Chen X, Weibel JA, Garimella SV. Continuous oil-water separation using polydimethylsiloxane-functionalized melamine sponge. Industrial & Engineering Chemistry Research. 2016;55(12):3596-602.
Ge J, Shi L-A, Wang Y-C, Zhao H-Y, Yao H-B, Zhu Y-B, et al. Joule-heated graphene-wrapped sponge enables fast clean-up of viscous crude-oil spill. Nature Nanotechnology. 2017;12(5):434-40.
Ge J, Zhao HY, Zhu HW, Huang J, Shi LA, Yu SH. Advanced sorbents for oil-spill cleanup: recent advances and future perspectives. Advanced materials. 2016;28(47):10459-90.
Gui X, Zeng Z, Lin Z, Gan Q, Xiang R, Zhu Y, et al. Magnetic and highly recyclable macroporous carbon nanotubes for spilled oil sorption and separation. ACS applied materials & interfaces. 2013;5(12):5845-50.
Hadji EM, Fu B, Abebe A, Bilal HM, Wang J. Sponge-based materials for oil spill cleanups: A review. Frontiers of Chemical Science and Engineering. 2020;14(5):749-62.
Kim T, Lee JS, Lee G, Seo DK, Baek Y, Yoon J, et al. Autonomous graphene vessel for suctioning and storing liquid body of spilled oil. Scientific reports. 2016;6:22339.
Kong Z, Wang J, Lu X, Zhu Y, Jiang L. In situ fastening graphene sheets into a polyurethane sponge for the highly efficient continuous cleanup of oil spills. Nano Research. 2017;10(5):1756-66.
Liu Z, Wang X, Gao M, Song J, Huang L, Liu J, et al. Unpowered oil absorption by a wettability sponge based oil skimmer. RSC advances. 2016;6(91):88001-9.
McKinney K, Caplis J, DeVitis D, Van Dyke K. Evaluation of oleophilic skimmer performance in diminishing oil slick thicknesses. International Oil Spill Conference Proceedings: International Oil Spill Conference; 2017. p. 1366-81.
Tran VT, Xu X, Mredha MTI, Cui J, Vlassak JJ, Jeon I. Hydrogel bowls for cleaning oil spills on water. Water research. 2018;145:640-9.
Turco A, Malitesta C, Barillaro G, Greco A, Maffezzoli A, Mazzotta E. A magnetic and highly reusable macroporous superhydrophobic/superoleophilic PDMS/MWNT nanocomposite for oil sorption from water. Journal of Materials Chemistry A. 2015;3(34):17685-96.
Wadsworth T. Comparison and Assessment of Waste Generated during Oil Spills. International Oil Spill Conference Proceedings: American Petroleum Institute; 2014. p. 1647-58.
Wu MB, Huang S, Liu TY, Wu J, Agarwal S, Greiner A, et al. Compressible Carbon Sponges from Delignified Wood for Fast Cleanup and Enhanced Recovery of Crude Oil Spills by Joule Heat and Photothermal Effect. Advanced Functional Materials. 2020:2006806.
Wu X, Lei Y, Li S, Huang J, Teng L, Chen Z, et al. Photothermal and Joule heating-assisted thermal management sponge for efficient cleanup of highly viscous crude oil. Journal of Hazardous Materials. 2021; 403:124090.
Xie A, Chen Y, Cui J, Lang J, Li C, Yan Y, et al. Facile and green fabrication of superhydrophobic sponge for continuous oil/water separation from harsh environments. Colloids and Surfaces A: Physicochemical and Engineering Aspects. 2019;563:120-9.
Xu J, Cao R, Li M, Chen G, Tian J. Superhydrophobic and superoleophilic cuttlebone with an inherent lamellar structure for continuous and effective oil spill cleanup. Chemical Engineering Journal. 2020:127596.
Yan C, Ji Z, Ma S, Wang X, Zhou F. 3D printing as feasible platform for on-site building oil-skimmer for oil collection from spills. Advanced Materials Interfaces. 2016;3(13):1600015.
Yang Y, Deng Y, Tong Z, Wang C. Multifunctional foams derived from poly (melamine formaldehyde) as recyclable oil absorbents. Journal of Materials Chemistry A. 2014;2(26):9994-9.
Abraham EO, Amarachi OP, Marvellous AY, Chikbuike PC, Christiana AO. In-Situ Burning As An Oil Spill Control Measure And Its Effect On The Environment. Nigeria Annual International Conference and Exhibition 2019, Lagos, Nigeria, Aug. 5-7, 2019.
Bentini R, Pola A, Rizzi LG, Athanassiou A, Fragouli D. A highly porous solvent free PVDF/expanded graphite foam for oil/water separation. Chemical Engineering Journal. 2019;372;1174-1182.
Chang J, Shi Y, Wu M, Li R, Shi L, Jin Y, et al. Solar-assisted fast cleanup of heavy oil spills using a photothermal sponge. Journal of Materials Chemistry A. 2018;6;9192.
Cheng M, Ju G, Jiang C, Zhang Y, Shi F. Magnetically directed clean-up of underwater oil spills through a functionally integrated device. Journal of Materials Chemistry A. 2013;1:13411-13416.
Choi S-J, Kwon T-H K, Im H, Moon D-I, Baek DJ, Seol M-L, Duarte JP, Choi Y-K. A Polydimethylsiloxane (PDMS) Sponge for the Selective Absorption of Oil from Water. ACS Applied Materials & Interfaces. 2011;3;4552-4556.
Deng D, Prendergast DP, MacFarlane J, Bagatin R, Stellacci F, Gschwend PM. Hydrophobic Meshes for Oil Spill Recovery Devices. ACS Applied Materials & Interfaces. 2013;5:774-781.
Ferguson A, Solo-Gabriele H, Mena K. Assessment for oil spill chemicals: Current knowledge, data gaps, and uncertainties addressing human physical health risk. Marine Pollution Bulletin. 2020; 150: 110746.
Gong C, Lao J, Wang B, Li X, Li G, Gao J, et al. Fast and all-weather cleanup of viscous crude-oil spills with Ti3C2Tx MXene wrapped sponge. Journal of Materials Chemistry A. 2020;8;20162.
Guo Z, Long B, Gao S, Luo J, Wang L, Huang X, et al. Carbon nanofiber based superhydrophobic foam composite for high performance oil/water separation. Journal of Hazardous Materials. 2021;402;123838.
Guselnikova O, Barras A, Addad A, Sviridova E, Szuneritis S, Postnikov P, Boukherroub R. Magnetic polyurethane sponge for efficient oil adsorption and separation of oil from oil-in-water emulsions. Separation and Purification Technology. 2020;240;116627.
Halake K, Bae S, Lee J, Cho Y, Jo H, Heo J, et al. Strategies for Fabrication of Hydrophobic Porous Materials Based on Polydimethylsiloxane for Oil-Water Separation. Macromol. Res. 2019;27:109-114.
Liu L, Lei J, Li L, Zhang R, Mi N, Chen H, Huang D, Li N. A facile method to fabricate the superhydrophobic magnetic sponge for oil-water separation. Materials Letters. 2017;195:66-70.
Liu Y, Ma J, Wu T, Wang X, Huang G, Liu Y, et al. Cost-Effective Reduced Graphene Oxide-Coated Polyurethane Sponge As a Highly Efficient and Reusable Oil-Absorbent. ACS Applied Materials & Interfaces. 2013;5;10018-10026.
Nguyen DD, Tai N-H, Lee S-B, Kuo W-S. Superhydrophobic and superoleophilic properties of graphene-based sponges fabricated using a facile dip coating method. Energy Environ. Sci. 2012;5;7908.

(56) References Cited

OTHER PUBLICATIONS

Peng L, Yuan S, Yan G, Yu P, Luo Y. Hydrophobic Sponge for Spilled Oil Absorption. Journal of Applied Polymer Science. 2014;131(20):40886.

Phanthong P, Reubroycharoen P, Kongparakul S, Samart C, Wang A, Hao X, et al. Fabrication and evaluation of nanocellulose sponge for oil/water separation. Carbohydrate Polymers. 2018;190;184-189.

Rattanaumpa I, Naowanon W, Amnuaypanich S, Amnuaypanich S. Polydimethylsiloxane Sponges Incorporated with Mesoporous Silica Nanoparticles (PDMS/H-MSNs) and Their Selective Solvent Absorptions. Ind. Eng. Chem. Res. 2019;58:21142-21154.

Schmidt W, Meyer P, DeVitis D, Delgado J-E, et al. Development of an ASTM Stationary Skimmer: Test Protocol—Phase 3: Application. Interspill 2009 Conference and Exhibition, Marseille, France, May 12-14, 2009.

Singh S, Jelinek R. Solar-mediated oil-spill cleanup by a carbon dot-polyurethane sponge. Carbon. 2020;160;196-203.

Tran DNH, Kabiri S, Sim TR, Losic D. Selective adsorption of oil-water mixtures using polydimethylsiloxane (PDMS)-graphene sponges. Environ. Sci.: Water Res. Technol. 2015;1:298-305.

Xue C-H, Li Y-R, Hou J-L, Zhang L, Ma J-Z, Jia S-T. Self-roughened superhydrophobic coatings for continuous oil-water separation. Journal of Materials Chemistry A. 2015;3:10248-10253.

Zhang A, Chen M, Du C, Guo H, Bai H, Li L. Poly(dimethylsiloxane) Oil Absorbent with a Three-Dimensionally Interconnected Porous Structure and Swellable Skeleton. ACS Applied Materials & Interfaces. 2013;5;10201-10206.

Zhang L, Zhang Y, Chen P, Du W, Feng X, Liu B-F. Paraffin Oil Based Soft-Template Approach to Fabricate Reusable Porous PDMS Sponge for Effective Oil/Water Separation. Langmuir. 2019;35:11123-11131.

Zhang X, Liu D, Ma Y, Nie J, Sui G. Super-hydrophobic graphene coated polyurethane (GN@PU) sponge with great oil-water separation performance. Applied Surface Science. 2017;422:116-124.

\* cited by examiner

SORBENT-BASED OIL SKIMMER AND METHODS OF USE

RELATED APPLICATIONS

The present application claims the benefit of U.S. Provisional Patent Application Ser. No. 63/140,179 filed Jan. 21, 2021 entitled "Sorbent-Based Oil Skimmer and Methods of Use" and U.S. Provisional Patent Application Ser. No. 63/234,066 filed Aug. 17, 2021 entitled "Sorbent-Based Oil Skimmer and Methods of Use," the disclosures of which are hereby incorporated by reference as if fully set forth herein.

BACKGROUND

Due to the massive amount of exploration, storage, and transportation of oils and organic solvents in modern society, accidental oil and organic solvent spills in water remain a global challenge. While the yearly number of oil spills and the total amount of oil spillage have been reduced significantly in recent years, the technologies used to clean up these oil spills have remained the same with only incremental improvements over time. Oil spill cleanup crews use booms to corral or contain the spilled oil, skimmers to separate and extract the congregated oil slicks, sorbent materials to soak up any remaining thin oil sheen, and other less than ideal methods including in-situ burning, chemical dispersants, and manual labor. To extract oil from water, most oil skimmers require energy to move an often oleophilic media (belts, discs, drums, tube, rope, mop, etc.) through the oil layer and scrape off the attached oil above the surface into a container. These oil skimmers are typically heavy and difficult to deploy and scale-up, require an electric or pneumatic motor to separate the oil and water and are highly-inefficient for extracting thin oil layers from water.

In a real-world oil spill recovery, mechanical oil recovery is often needed when there are very thin layers of oil to alleviate the manual labor and solid waste required to use sorbent materials to clean up the remaining thin oil slicks. Notably, sorbent materials used in the field today are single-use materials that usually contribute to larger amounts of solid waste resulting from oil spills than liquid waste, with ratios as high as 400:1. Recently, sorbent materials researchers have been primarily focused on modifying the surface of substrates to improve the hydrophobic and oleophilic properties of the materials. Desired characteristics of state-of-the-art oil/water separation materials include high oil-sorption capacities, super-hydrophobicity, durability, reusability, low-cost, and facile fabrication. Additional features have been imparted on advanced sorbent materials including resistance to ultrahigh temperatures for in-situ oil burn-off from the sorbent, magnetism to facilitate sorbent recovery via magnets, stimuli-response such as resistive heating (Joule heating) and photothermal effects for crude oil absorption, and more. The most noteworthy and applicable of these advanced sorbent features includes Joule heating of a semi-conductive sorbent-material to lower the viscosity of crude oil and facilitate rapid absorption of the high viscosity pollutant. While this capability and others are impressive characteristics of novel sorbent materials, they have only been proven to be useful in the small counter-top-sized oil spill simulations. Very little work has been done to scale-up these sorbent materials by utilizing low-cost materials and facile fabrication methods.

The most promising sorbent-based technologies to reduce the amount of manual labor and solid waste required for oil spill cleanup include oil-collecting or oil-extraction devices. Instead of improving the sorption capacities of sorbent materials, the goal of these devices is to utilize sorbent materials to collect or extract the oil utilizing the material properties of the sorbent. The simplest of these devices includes placing a tube into the center of a sorbent member, such as an oleophilic and hydrophobic sponge, and pumping to extract the oil continuously as the sorbent continues to absorb and replace extracted oil. However, the rate of oil extraction is extremely slow using this technique and often results in some amount of water extracted through the sponge as well. Another method known as vessel-type oil collectors includes utilizing a sorbent material and gravity (or some external force) to fill a container with oil to later be removed. However, this method has not been demonstrated to be capable of extracting oil from the vessel during oil absorption in a sufficiently efficient, continuous, and automated process. It is to improving this system that the systems and methods of the present disclosure are directed.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness.

DETAILED DESCRIPTION

Figure 1:
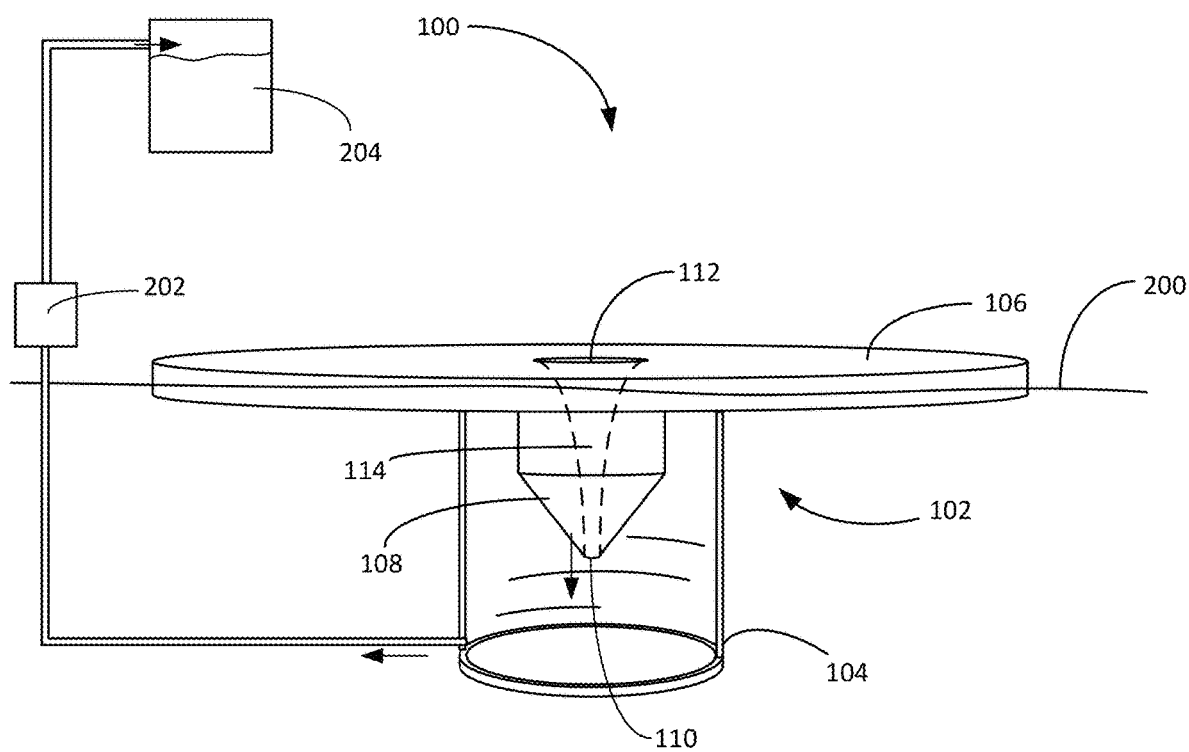
FIG. 1 presents a side view of the sorbent-based oil skimmer base design.
Figure 2A:
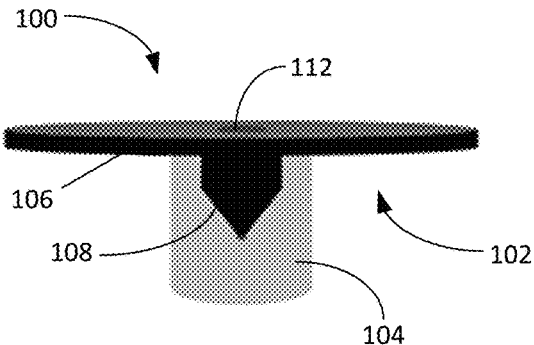
FIGS. 2a-2d present various embodiments of the top sheet of the sorbent-based oil skimmer.
Figure 2B:
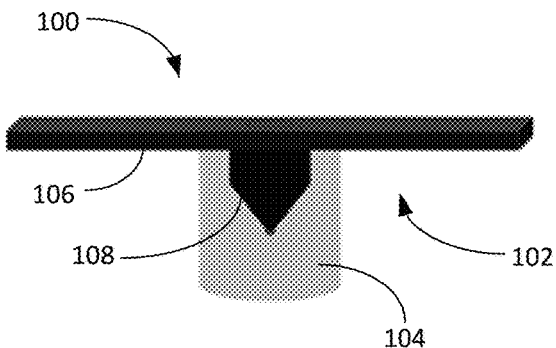
Figure 2C:
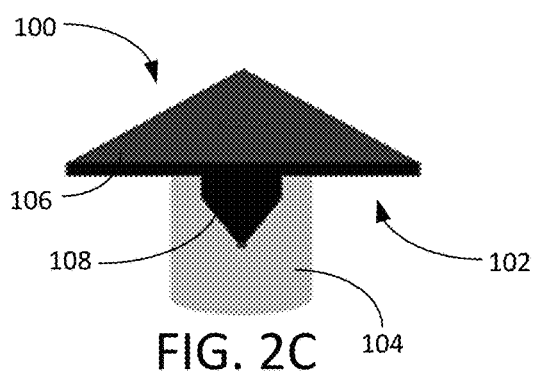
Figure 2D:
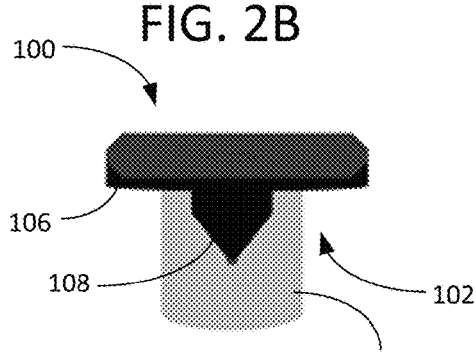
Figure 3A:
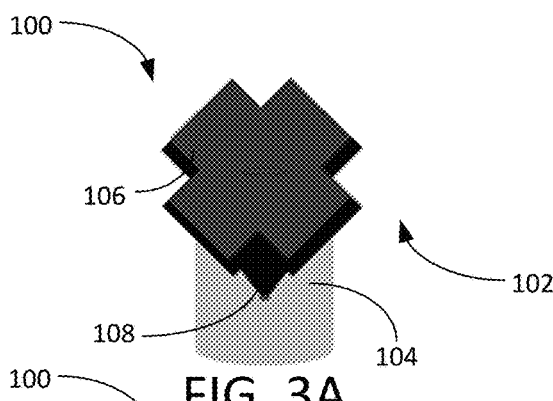
FIGS. 3a-3d present various embodiments of the top sheet of the sorbent-based oil skimmer.
Figure 3B:
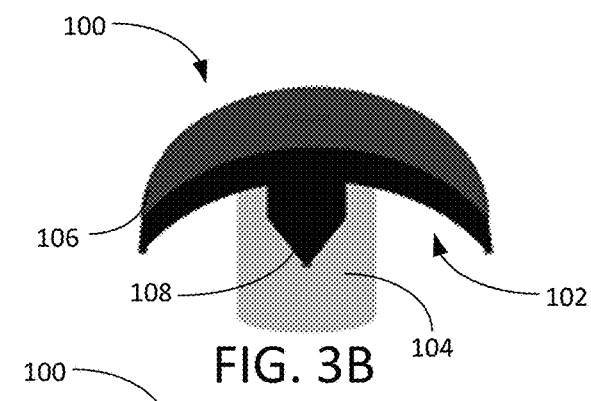
Figure 3C:
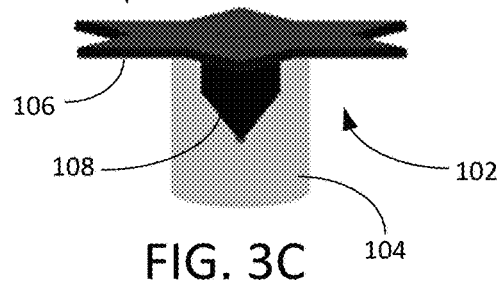
Figure 3D:
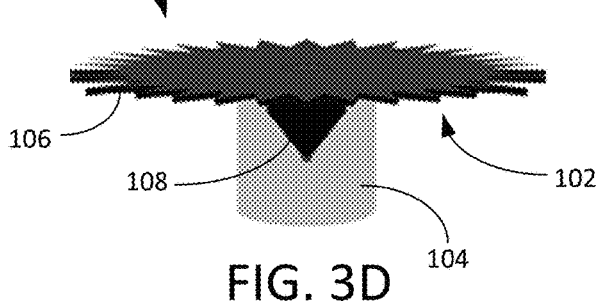
Figure 4A:
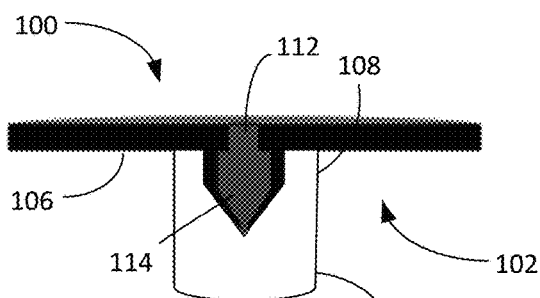
FIGS. 4a-4d present various embodiments of the shell of the sorbent-based oil skimmer.
Figure 4B:
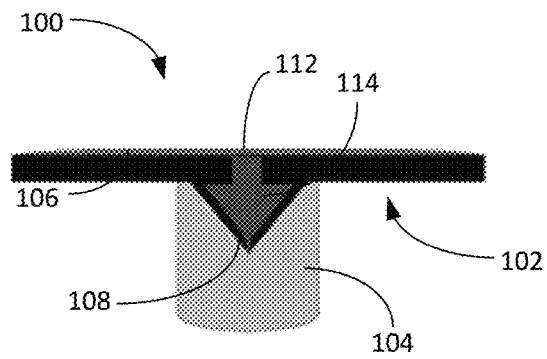
Figure 4C:
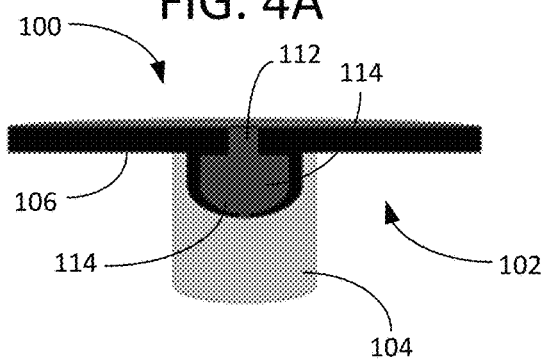
Figure 4D:
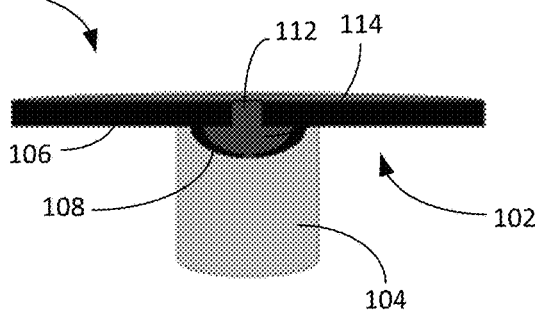
Figure 5A:
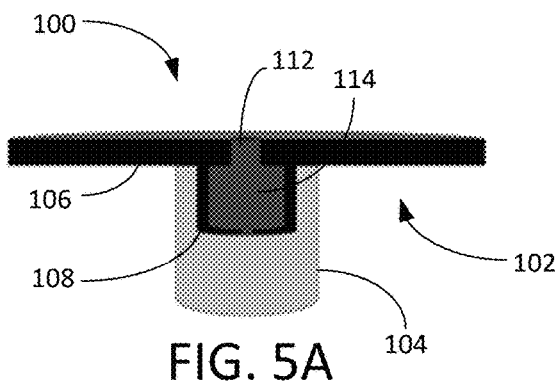
FIGS. 5a-5d present various embodiments of the shell of the sorbent-based oil skimmer.
Figure 5B:
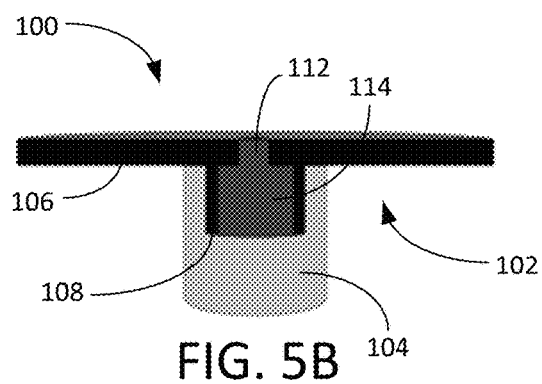
Figure 5C:
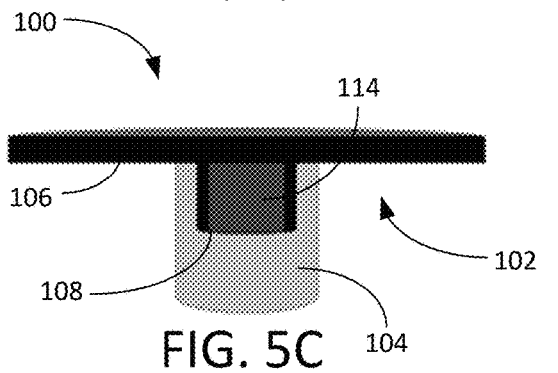
Figure 5D:
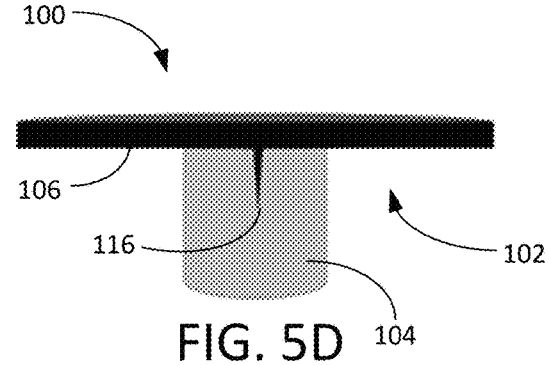

The present disclosure is directed to a floating vessel-type oil collector capable of continuous oil extraction from water via peristaltic pumping. The nanocomposite sorbent material used in the device is highly durable, reusable, and exhibits semi-conductivity for efficient Joule heating of the nanocomposite sponge to decrease viscosity of the spilled oil to more rapidly absorb and extract crude oil from the water surface. The separation of oil from water is encouraged by the hydrophobic and oleophilic properties of the funnel-shaped nanocomposite sponge and gravity. Thus, a key benefit of the sorbent-based oil skimmer 100 is the passive oil-water separation mechanism that is driven by gravity. In some embodiments, no applied energy to the system is needed to separate oil from water before evacuating the captured oil from the skimmer 100 with a suitable pump. The sorbent-based oil skimmer 100 is easily scalable to massive sizes via additive manufacturing or other manufacturing means.

Before describing various embodiments of the present disclosure in more detail by way of exemplary description, examples, and results, it is to be understood that the embodiments of the present disclosure are not limited in application to the details of methods and apparatus as set forth in the following description. The embodiments of the present disclosure are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that certain embodiments of the present disclosure can be practiced without these specific details. In other instances, features which are well known to persons of ordinary skill in the art have not been described in detail to avoid unnecessary complication of the description.

Unless otherwise defined herein, scientific and technical terms used in connection with the embodiments of the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which embodiments of the present disclosure pertain. All patents, published patent applications, and non-patent publications referenced in any portion of this application are herein expressly incorporated by reference in their entirety to the same extent as if each individual patent or publication was specifically and individually indicated to be incorporated by reference.

While the methods and apparatus of the embodiments of the present disclosure have been described in terms of particular embodiments, it will be apparent to those of skill in the art that variations may be applied thereto and in the steps or in the sequence of steps of the methods described herein without departing from the spirit and scope of the inventive concepts. All such similar substitutes and modifications apparent to those skilled in the art are deemed to be within the spirit and scope of the systems as defined herein.

As utilized in accordance with the methods and apparatus of the embodiments of the present disclosure, the following terms, unless otherwise indicated, shall be understood to have the following meanings.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error. Further, in this detailed description, each numerical value (e.g., time or frequency) should be read once as modified by the term "about" (unless already expressly so modified), and then read again as not so modified unless otherwise indicated in context. The use of the term "about" or "approximately" may mean a range including ±0.5%, or ±1%, ±2%, or ±3%, or ±4%, or ±5%, ±6%, or ±7%, or ±8%, or ±9%, or ±10%, or ±11%, or ±12%, or ±13%, or ±14%, or ±15%, or ±25% of the subsequent number unless otherwise stated.

As used herein, the term "substantially" means that the subsequently described event or circumstance completely occurs or that the subsequently described event or circumstance occurs to a great extent or degree. For example, the term "substantially" means that the subsequently described event or circumstance occurs at least 80% of the time, or at least 90% of the time, or at least 95% of the time, or at least 98% of the time.

Features of any of the embodiments described herein may be combined with any of the other embodiments to create a new embodiment. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50. Similarly, fractional amounts between any two consecutive integers are intended to be included herein, such as, but not limited to, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, and 0.95. For example, the range 3 to 4 includes, but is not limited to, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, and 3.95. Thus, even if specific data points within the range, or even no data points within the range, are explicitly identified or specifically referred to, it is to be understood that any data points within the range are to be considered to have been specified, and that the inventors possessed knowledge of the entire range and the points within the range.

Reference to a series of ranges includes ranges which combine the values of the boundaries of different ranges within the series. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range.

Thus, to further illustrate reference to a series of ranges, for example, a range of 1-1,000 includes, for example, 1-10, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. The range 100 units to 2000 units therefore refers to and includes all values or ranges of values of the units, and fractions of the values of the units and integers within said range, including for example, but not limited to 100 units to 1000 units, 100 units to 500 units, 200 units to 1000 units, 300 units to 1500 units, 400 units to 2000 units, 500 units to 2000 units, 500 units to 1000 units, 250 units to 1750 units, 250 units to 1200 units, 750 units to 2000 units, 150 units to 1500 units, 100 units to 1250 units, and 800 units to 1200 units. Any two values within the range of about 100 units to about 2000 units therefore can be used to set the lower and upper boundaries of a range in accordance with the embodiments of the present disclosure.

The present disclosure will now be discussed in terms of several specific, non-limiting, examples, and embodiments. The examples described below, which include particular embodiments, will serve to illustrate the practice of the present disclosure, it being understood that the particulars shown are by way of example and for purposes of illustrative discussion of particular embodiments and are presented in the cause of providing what is believed to be a useful and readily understood description of procedures as well as of the principles and conceptual aspects of the present disclosure.

With reference to FIG. 1, the sorbent-based oil skimmer 100 generally includes a sorbent-based sponge 102 contained within a housing or "encasing" 104. The sponge 102 includes a top sheet 106 and a shell (or funnel) 108 that can be contained within the encasing 104. The sponge 102 can include a drain 110, a vent 112 and a central chamber 114, which cooperate to pass oil absorbed by the top sheet 106 from an oil layer 200 into the encasing 104 through the shell 108 and drain 110. It will be appreciated that the oil layer 200 may include a crude oil or other petroleum-based liquids suspended on top of a water-based liquid, such as seawater, brine, or freshwater. The oil layer 200 may include water and other components that present as immiscible or miscible mixtures, including emulsions. In this way, the oil skimmer 100 can be configured to capture an oil-containing first liquid (oil layer 200) from the top of a second liquid (a water-based layer).

The skimmer 100 can be configured with an appropriate amount of buoyancy that the top sheet 106 is partially immersed in the oil layer 200, but without submerging the vent 112 below the surface of the oil-water mixture. Oil is pulled out of the sponge 102 into the interior of the encasing 104, where it can be stored for bulk removal when the skimmer 100 is full, or evacuated on a continuous or periodic basis by a pump 202. In some embodiments, the pump 202 is a peristaltic pump that moves the collected oil from the encasing to an external storage vessel 204 located on a boat, platform or other suitable onshore or offshore facility.

Before addressing the various configurations and applications for the sorbent-based oil skimmer 100, a brief description of the sponge 102 is provided. In exemplary embodiments, the sponge 102 is manufactured from a sorbent material that is oleophilic, hydrophobic or oleophilic and hydrophobic. In some embodiments, the sponge 102 is manufactured from a silicone polymer impregnated with carbonaceous material. For example, the sponge 102 can be constructed from polydimethylsiloxane (PDMS) impregnated with carbon black (CB) to create a nanocomposite polymer (CB/PDMS). In one example, a two-part PDMS kit is mixed with 5 wt %, 10 wt %, 15 wt %, 20 wt %, and 25 wt % CB via centrifugal mixing with a Thinky mixer (AR-100) to create the nanocomposite prepolymer (CB/PDMS). The CB/PDMS can be mixed with salt at a 4:1, 5.7:1, and 9:1 salt:CB/PDMS ratios (80 wt %, 85 wt %, and 90 wt %) to create an uncured mixture (PCS) that is easily moldable into various shapes for the sponge 102. The PCS can be molded into cubes ($1 \times 1 \times 1$ cm=1 cm$^3$ and $5 \times 5 \times 5$ cm=125 cm$^3$) with 3D printed templates and cured in an oven. The salt porogen can be removed via sonication and mechanically squeezing in running warm water.

In other embodiments, the sponge 102 is manufactured from materials that require an open-cell network of porosity to allow the oil to flow through the microstructure of the sorbent-based sponge 102 and into the encasing 104. Suitable porous materials include sponges, fabrics, woven fibers, natural microstructures, foams, meshes, and membranes. The materials that may be used independently or in conjunction with other material(s) to fabricate the sorbent material used in the sponge 102 include, but are not limited to polymers, elastomers, silicone rubber, polydimethylsiloxane (PDMS), platinum-catalyzed silicone polymers, melamine, polylactic acid (PLA), polyurethane, polyethylene terephthalate (PET), polypropylene, functional polymers, polyethylene, and aerogels, whether silica-based or aeroclays.

The sponge 102 can also be manufactured with particles or polymer fillers, including the carbonaceous nanoparticles, carbon black, carbon nanotubes, carbon nanowires, graphene, carbon-based sponges, magnetic iron(III) oxide ($Fe_2O_3$), and nanowire meshes. The sponge 102 can also be manufactured with composites and nanocomposites, including carbon-based nanocomposites, $Fe_2O_3$-based nanocomposites, and carbon fiber sponges.

In some embodiments, the sponge 102 is manufactured from naturally occurring or naturally-derived components, including peat moss, straw, hay, sawdust, ground corncobs, feathers, cellulose-based materials, kapok/milkweed seed, hair, clay, perlite, vermiculite, glass wool, sand, volcanic ash, cotton, rice husks, rice hulls, filter paper, wood, tree bark, bamboo, fruits, vegetables, and other readily available carbon-based products. In yet other embodiments, the sponge 102 is manufactured with man-made materials including cat litter, bio-based materials, and absorbent pads. It will be appreciated that the sponge 102 can be manufactured from any number of combinations of the materials set forth herein.

Turning to FIGS. 2-7, shown therein are various configurations of the sponge 102. The top sheet 106 may be any common geometric shape including circular (FIG. 2A), rectangular (FIG. 2B), triangular (FIG. 2C), hexagonal/octagonal (FIG. 2D), 'X'-shaped or cross-shaped (FIG. 3A), crescent-shaped (FIG. 3B), flower or star shape (FIG. 3C), any unique shape with the aim to maximize sheet surface area in contact with oil for faster extraction rates (e.g., FIG. 3D), and uncommon shapes such as asymmetrical, freeform, or abstract shapes. The sorbent shell 108 can include the central chamber 114 and may be an extended cone (FIG. 4A), cone (FIG. 4B), extended semi-spherical (FIG. 4C), semi-spherical (FIG. 4D), cylindrical (FIG. 5A), open-ended cylindrical with the vent 112 (FIG. 5B), and open-ended cylindrical without the vent 112 (FIG. 5C).

Figure 6A:
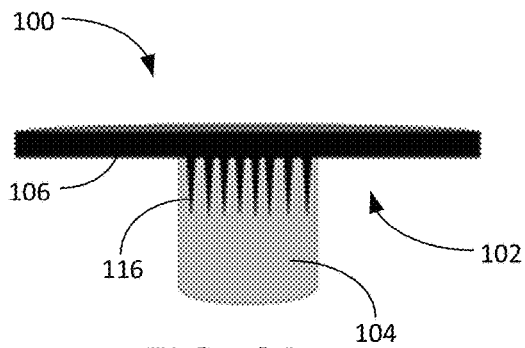
FIGS. 6a-6d present various embodiments of the shell of the sorbent-based oil skimmer.
Figure 6B:
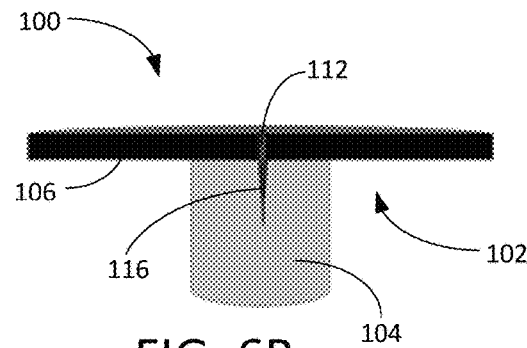
Figure 6C:
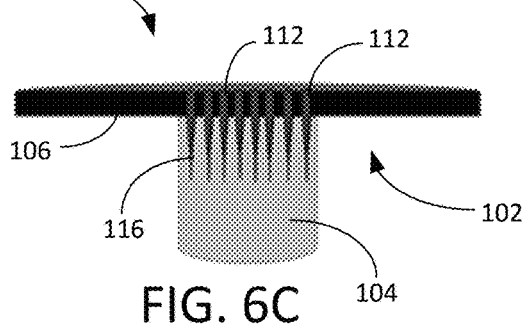
Figure 6D:
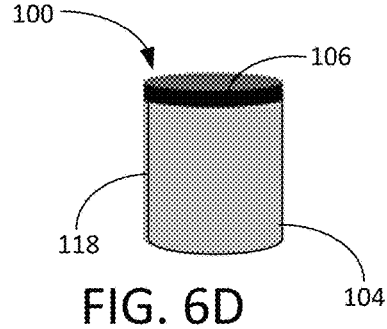

The sponge 102 may also include stalactite-like extensions 116 on the underside of the top sheet 106, which can be configured to drip oil down (due to gravity). The skimmer 100 may include one extension 116 without the vent 112 (FIG. 5D), several extensions 116 without vent holes 112 (FIG. 6A), a single extension 116 that includes the vent 112 (FIG. 6B), and several extensions 116 with multiple vents 112 (FIG. 6C). The sorbent-based sponge 102 (both top sheet 106 and shell 108) may be 3D-printed into any shape necessary to meet the geometric requirements of the particular embodiment of the skimmer 100 or as required for specific applications.

Figure 7A:
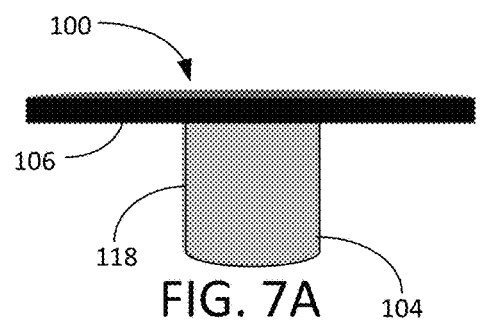
FIGS. 7a-7d present various embodiments of the sorbent-based oil skimmer.

In some applications, it may be desirable to use the top sheet 106 alone without the shell 108, but with an oleophilic layer 118 on the interior surface of the encasing 104, such that the top sheet 106 is configured to drip oil along the inside of the encasing 104. In these embodiments, the top sheet 106 may be approximately the same diameter as the encasing 104 (FIG. 6D) or larger than the diameter of the encasing 104 (FIG. 7A).

Figure 7B:
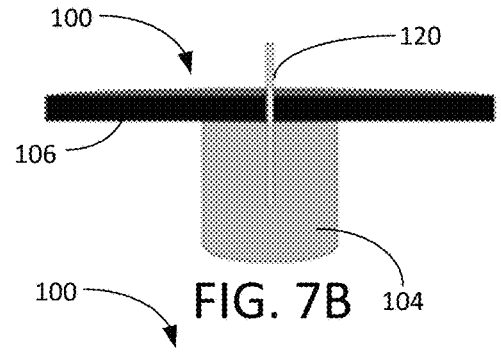
Figure 7C:
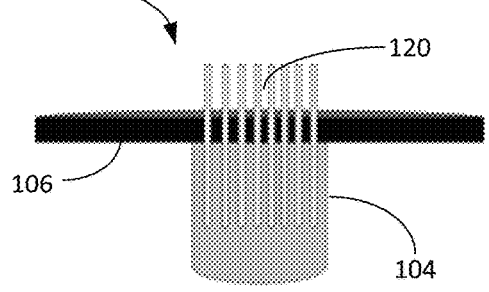
Figure 7D:
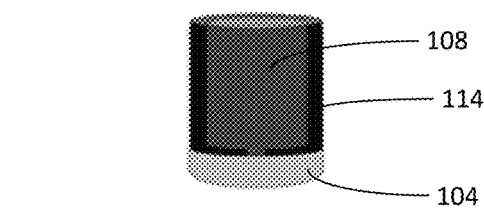

In other variations, a single oleophilic object 120 (e.g., a rod, pipe, or other object) can be extended through the top sheet 106 to drip oil down into the encasing 104 due to gravity (FIG. 7B). In other embodiments, a plurality of oleophilic objects 120 can be extended through the top sheet 106 (FIG. 7C). In yet other variations, the top sheet 106 is omitted, leaving only the hollow shell 108 within the encasing 104 (FIG. 7D).

The encasing 104 of the sorbent-based oil skimmer 100 may be manufactured from a polymer or other rigid material, including through additive manufacturing techniques. The encasing 104 includes the hard shell around the sorbent-based sponge 102, including the main body (encases the hollow shell 108 of the sponge 102), the lid and vent, and potentially necessary lid extensions to secure the sponge 102 firmly to the encasing 104. The encasing 104 may be made from any hard material that does not dissolve in water, oil, and preferably organic solvents. The encasing may be made up entirely by one, or any potential combination of the following list of materials including but are not limited to metals such as aluminum, steel, copper, iron, nickel, titanium, magnesium, zinc, silicon, metal alloys, polymers such as thermoplastics, polylactic acid (PLA), acrylonitrile butadiene styrene (ABS), polyethylene (low-density (LDPE) and high-density (HDPE)), acrylic, nylon, polycarbonate, polypropylene, polystyrene, elastomers, thermosets including epoxies, phenolics, bismaleimide, fluoropolymers, melamine, and elastomers, and composites including fiber-reinforced composites, matrix materials, continuous or chopped fiber products, carbon fiber, glass fiber, Kevlar fiber, hybrid polymers, other fillers including microparticles, nanoparticles, and rheology modifiers. In some embodiments, the encasing 104 is manufactured from naturally-occurring substances including wood, ceramic, concrete, glass and clay.

The encasing 104 or vessel that covers the sorbent shell 108 can be pressed into firm contact with the top sheet 106 to prevent water from leaking into the vessel 104, and can be designed and fabricated into many different shapes and sizes. The primary function of the encasing 104 is to provide an isolated environment where oil will be separated from the water and subsequently extracted via pumping. The secondary function is to bring the oil to one extraction point; thus, the encasing 104 will ideally be shaped to facilitate gravity pulling the oil toward the extraction point. In other embodiments, multiple extraction points are used, with multiple pumps or manifolds to extract oil from the encasing 104.

Figure 8A:
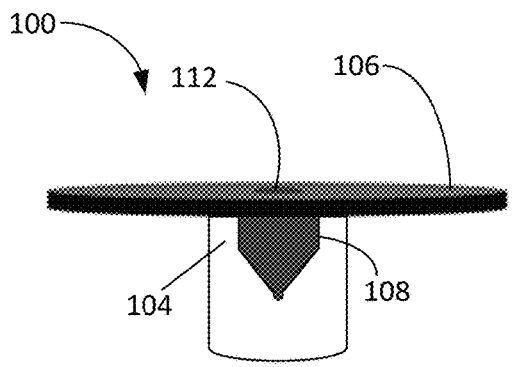
FIGS. 8a-8d present various embodiments of the encasing of the sorbent-based oil skimmer.
Figure 8B:
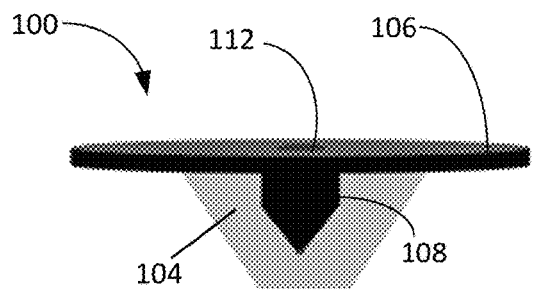
Figure 8C:
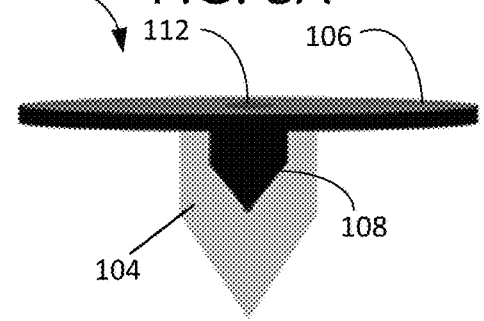
Figure 8D:
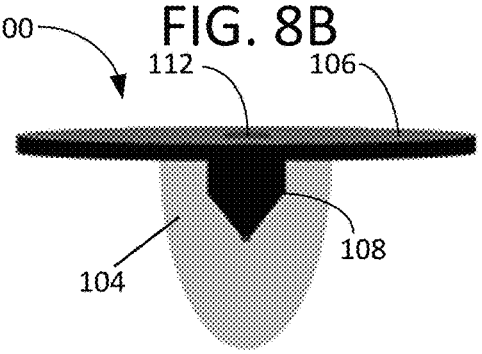
Figure 9A:
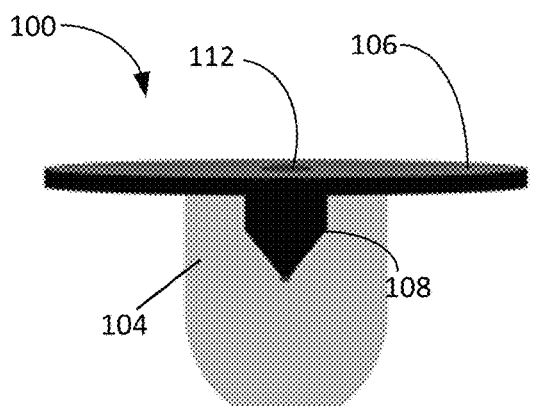
FIGS. 9a-9d present various embodiments of the encasing of the sorbent-based oil skimmer.
Figure 9B:
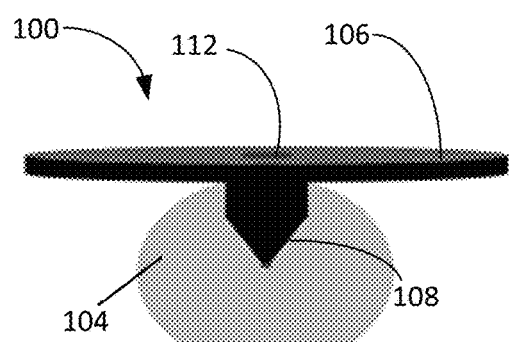
Figure 9C:
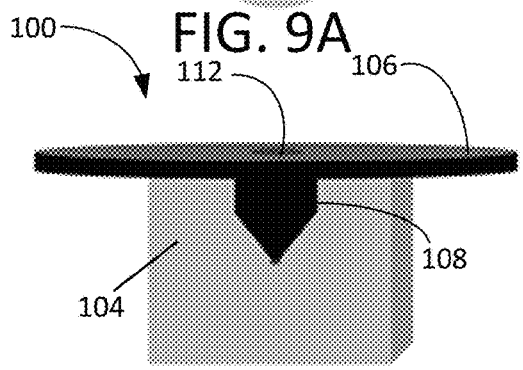
Figure 9D:
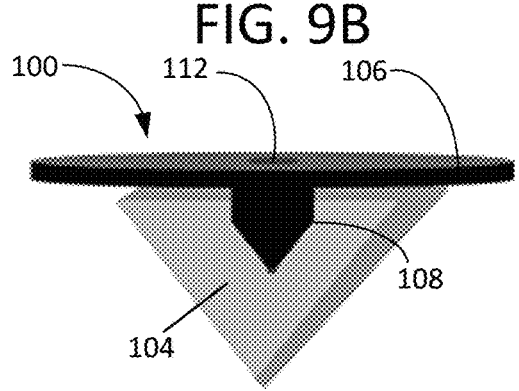

In some embodiments, the encasing 104 is constructed according to the following forms: cylindrical (FIG. 8A), conical (FIG. 8B), extended cone (FIG. 8C), semi-spherical or bowl-shaped (FIG. 8D), extended bowl (FIG. 9A), spherical (FIG. 9B), cube or rectangular prism (FIG. 9C), and pyramid (FIG. 9D).

Having described the general form and variations of the sponge 102 and encasing 104, attention is drawn to the various designs and applications for the skimmer 100 depicted in FIGS. 10-12. In some embodiments, the sorbent-based oil skimmer 100 includes a counterweight 122 attached to the encasing 104 to help maintain a vertical floating orientation (FIG. 10A). The counterweight 122 may be constructed using weights (as shown in FIG. 10A), or by integrating weights or a weighted portion into the encasing 104. The counterweights 122 are selected so that the skimmer 100 maintains a proper buoyancy and level within the oil layer 200.

Figure 10A:
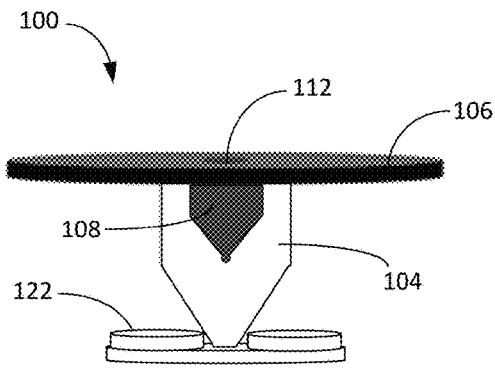
FIGS. 10a-10d present various embodiments of the sorbent-based oil skimmer.
Figure 10B:
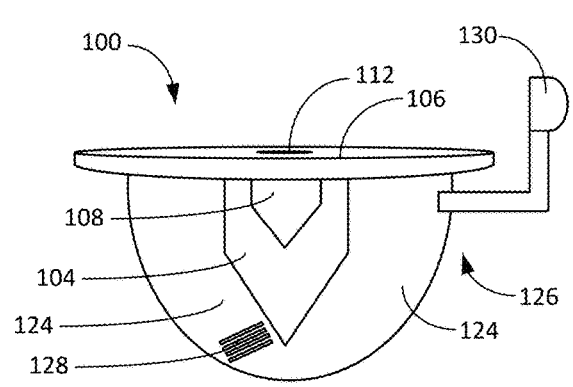
Figure 10C:
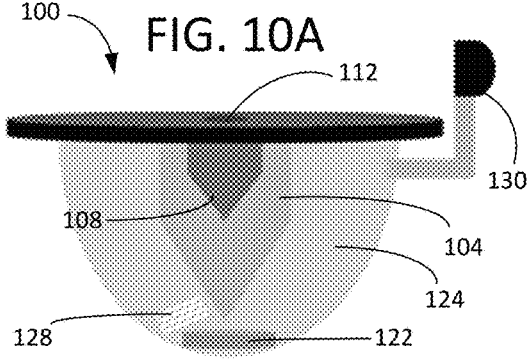

In another embodiment, the sorbent-based oil skimmer 100 can include a ballast tank 124 surrounding the encasing 104. The ballast tank 124 is optionally provided with a buoyancy adjustment system 126 to maintain a desired buoyancy in the water to ensure proper placement of the sponge 102 within the oil layer 200. The buoyancy adjustment system 126 can include a displacement vent 128 and low-pressure blower 130 to feed atmospheric air into the ballast tank 124 to control the buoyancy of the skimmer 100 (FIG. 10B). As the skimmer 100 collects more oil within the encasing 104, the blower 130 can be used to displace water from the ballast tank 124 to increase the buoyancy to counteract the increased weight of oil within the encasing 104. In other embodiments, the skimmer 100 includes a combination of counterweights 122 and the ballast tank 124 (FIG. 10C).

Figure 10D:
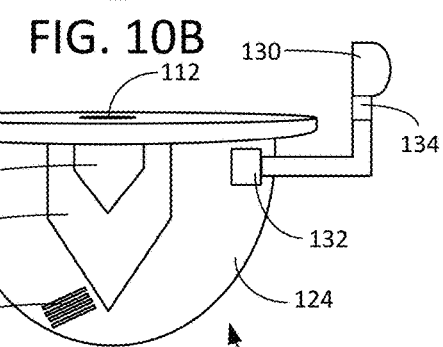

In yet another embodiment, the buoyancy adjustment system 126 is provided with an onboard control system 132 that is configured to cooperate with the buoyancy adjustment system 126 to adjust the orientation and buoyancy of the skimmer 100 in response to measurements made by one or more sensors 134, which can be configured to determine the level and position of the skimmer 100 in the water. The onboard control system 132 and buoyancy adjustment system 126 cooperate to detect the position and orientation of the skimmer 100 and adjust the buoyancy of the skimmer 100 to automatically maintain the vertical floating orientation of the skimmer 100 for a self-balancing sorbent-based oil skimmer 100 (FIG. 10D).

Figure 11A:
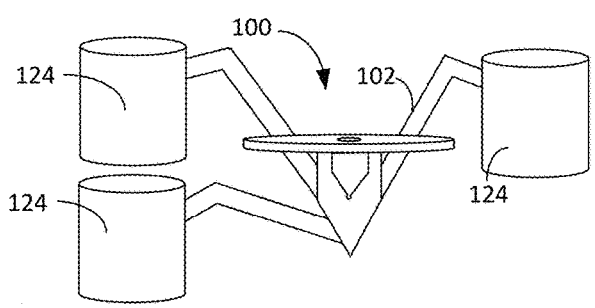
FIGS. 11a-11d present various embodiments of the sorbent-based oil skimmer.
Figure 11B:
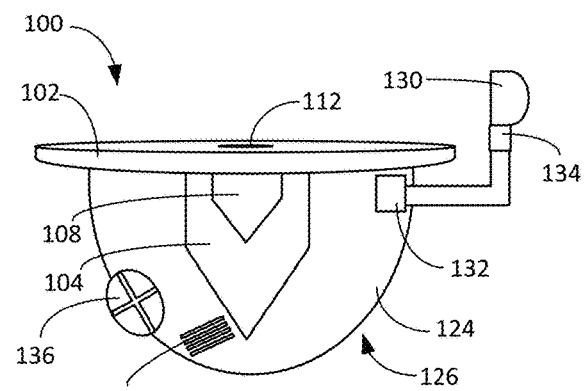

In another embodiment, the sorbent-based oil skimmer 100 mimics the design of conventional weir-type oil skimmers, but with the sorbent-based sponge 102 used to facilitate the efficient and effective separation of oil from water (FIG. 11A). In this embodiment, the skimmer 100 includes one or more external ballast tanks 124 that cooperate to maintain the orientation and level of the sponge 102 within the oil layer 200. In yet another embodiment, the skimmer 100 includes a propulsion module 136 that is capable of moving and rotating the skimmer 100 in response to autonomous or remote control. The propulsion module 136 permits the skimmer 100 to operate as a mobile, self-propelled, and self-balancing sorbent-based oil skimmer 100 that utilizes directionally controlled propulsion to navigate through the aquatic environment and soak up and extract oil slicks and oil sheens (FIG. 11B).

Figure 11C:
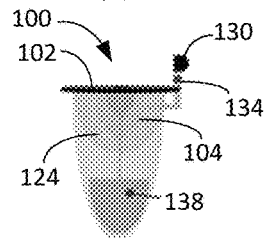
Figure 11D:
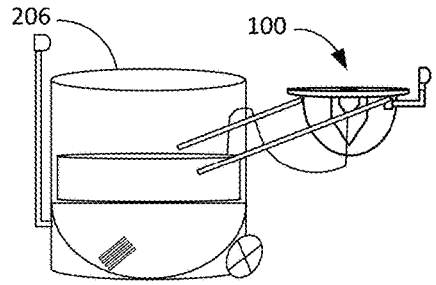

In some embodiments, the skimmer 100 incorporates a collection chamber 138 to hold larger amounts of separated oil (FIG. 11C). The skimmer 100 can also be constructed such that a boat 206 pulls or pushes the skimmer 100 through oil slicks and oil sheens so that the sorbent-based oil skimmer 100 may absorb and extract spilled oil from the surface oil layer 200 onto the boat 206 to hold a large amount of extracted oil and navigate through the environment (FIG. 11D).

Figure 12A:
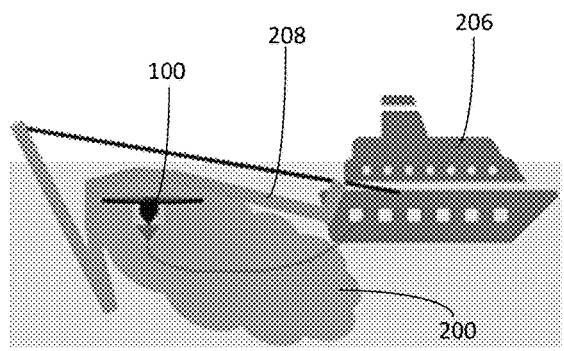
FIGS. 12a-12d present various applications for the sorbent-based oil skimmer.
Figure 12B:
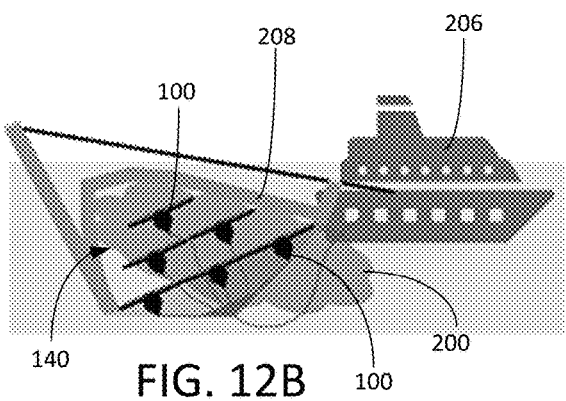

Turning to FIGS. 12A-D, shown therein are applications in which the sorbent-based oil skimmer 100 is deployed in array and boom configurations. The sorbent-based oil skimmer 100 may be attached to an existing oil boom 208 or placed in the corralled oil to efficiently extract the corralled oil from water (FIG. 12A). In other situations, it may be desirable to deploy multiple sorbent-based oil skimmers 100 in an interconnected array 140 that can be connected to one or more common peristaltic pumps 202 for efficient large-scale oil extraction from water. The array 140 of skimmers 100 could be used in conjunction with the oil boom 208 to help corral and contain the oil (FIG. 12B).

Figure 12C:
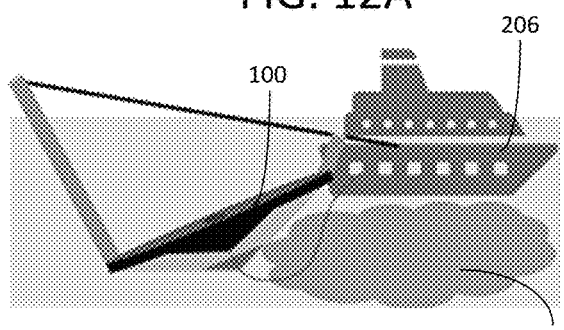
Figure 12D:
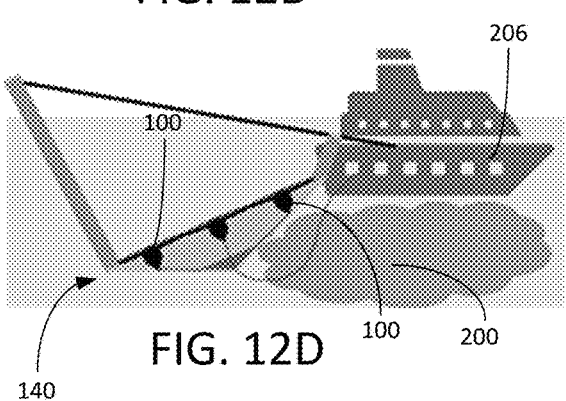

In larger applications, the sorbent-based oil skimmer 100 may be scaled-up to sizes as wide as the boat 206 in the shape of the oil boom 208 to simultaneously corral, absorb, and extract the thin oil layer 200 (FIG. 12C). Similarly, the array 140 of skimmers 100 could be used to function similarly to the oil boom 208 and dragged by the boat 206 (FIG. 12D).

Thus, in some embodiments, the sorbent-based oil skimmer 100 is configured to collect oil from an oil layer with a sponge and then passively deposit the oil in an encasing, where the oil can be continuously or periodically removed by pumping or other means. The sponge has a top sheet in contact with the oil layer and a shell connected to the top sheet, where the shell extends into the encasing. Oil collected by the top sheet is conveyed through the shell, where it is deposited into the encasing under the force of gravity. In some applications, the sponge is manufactured from a silicone-based polymer that has been impregnated with carbonaceous material. The skimmer may optionally include counterweights, ballast tanks, buoyancy adjustment systems and propulsion modules. The embodiments of the present disclosure are well adapted to carry out the objects and attain the ends and advantages mentioned above, as well as those inherent therein. While the skimmer 100 has been described and illustrated herein by reference to particular non-limiting embodiments in relation to the drawings attached thereto, various changes and further modifications, apart from those shown or suggested herein, may be made therein by those of ordinary skill in the art, without departing from the spirit of the inventive concepts.

It is claimed:

1. A sorbent-based oil skimmer configured to capture an oil-containing first liquid from the top of a second liquid, the oil skimmer comprising: an encasing; and a sponge partially encased within the encasing, wherein the sponge is constructed from a sorbent material, wherein the sponge comprises: a top sheet; a vent comprising an opening in the top sheet, wherein the vent is in direct communication with the atmosphere above the sorbent-based oil skimmer; and a shell connected to the top sheet, wherein the shell is contained within the encasing below the top sheet.

2. The sorbent-based oil skimmer of claim 1, wherein the sponge is constructed from a nanocomposite polymer.

3. The sorbent-based oil skimmer of claim 2, wherein the nanocomposite polymer comprises polydimethylsiloxane (PDMS) impregnated with carbon black (CB).

4. The sorbent-based oil skimmer of claim 1, wherein the sponge is constructed from a material selected from the group of materials consisting of elastomers, silicone rubber, polydimethylsiloxane (PDMS), platinum-catalyzed silicones, melamine, polylactic acid (PLA), polyurethane, polyethylene terephthalate (PET), polypropylene, polyethylene, and aerogels.

5. The sorbent-based oil skimmer of claim 1, wherein the top sheet is configured with a shape selected from the group of shapes consisting of circular, rectangular, triangular, hexagonal, octagonal, cross-shaped, crescent-shaped, flower-shaped, and star-shaped.

6. The sorbent-based oil skimmer of claim 1, wherein the sponge further comprises:
a drain in the shell; and
a central chamber inside the shell that connects the vent and the drain.

7. The sorbent-based oil skimmer of claim 1, wherein the encasing further comprises an oleophilic coating.

8. The sorbent-based oil skimmer of claim 1, further comprising a counterweight attached to a lower portion of the encasing.

9. The sorbent-based oil skimmer of claim 1, further comprising a ballast tank that surrounds the encasing.

10. The sorbent-based oil skimmer of claim 9, further comprising a pump configured to remove oil captured within the encasing.

11. The sorbent-based oil skimmer of claim 10, wherein the pump is a peristaltic pump.

12. The sorbent-based oil skimmer of claim 1, wherein the sponge is configured for Joule heating to decrease the viscosity of the oil captured by the sponge.

13. The sorbent-based oil skimmer of claim 1, wherein the sorbent-based oil skimmer further comprises a propulsion module capable of moving the sorbent-based oil skimmer through the first and second liquids.

14. A sorbent-based oil skimmer configured to capture an oil-containing first liquid from the top of a second liquid, the sorbent-based oil skimmer comprising: an encasing; a ballast connected to the encasing; and a sponge constructed from a sorbent material, wherein the sponge comprises: a top sheet in contact with the first liquid; a vent comprising an opening in the top sheet, wherein the vent is in direct communication with the atmosphere above the sorbent-based oil skimmer; and a shell connected to the top sheet, wherein the shell extends below the top sheet into the encasing; and wherein the sponge is configured to absorb oil from the oil-containing first liquid and passively carry the absorbed oil into the encasing.

15. The sorbent-based oil skimmer of claim 14, wherein the oil is dropped from the shell of the sponge into the encasing by the force of gravity.

16. A sorbent-based oil skimmer configured to collect oil from an oil layer, the oil skimmer comprising:
    an encasing;
    a sponge constructed from a silicone polymer impregnated with carbonaceous material, wherein the sponge comprises:
        a top sheet in contact with the oil layer;
        a vent comprising an opening in the top sheet, wherein the vent is in direct communication with the atmosphere above the oil skimmer; and
        a shell connected to the top sheet, wherein the shell extends below the top sheet into the encasing; and
        wherein the sponge is configured to absorb oil from the oil layer and passively deposit the absorbed oil into the encasing under the force of gravity.

17. The sorbent-based oil skimmer of claim 16, further comprising a ballast tank attached to the encasing.

18. The sorbent-based oil skimmer of claim 17, further comprising a buoyancy adjustment system for automatically adjusting the buoyancy provided by the ballast tank.

* * * * *